Patented Apr. 15, 1930

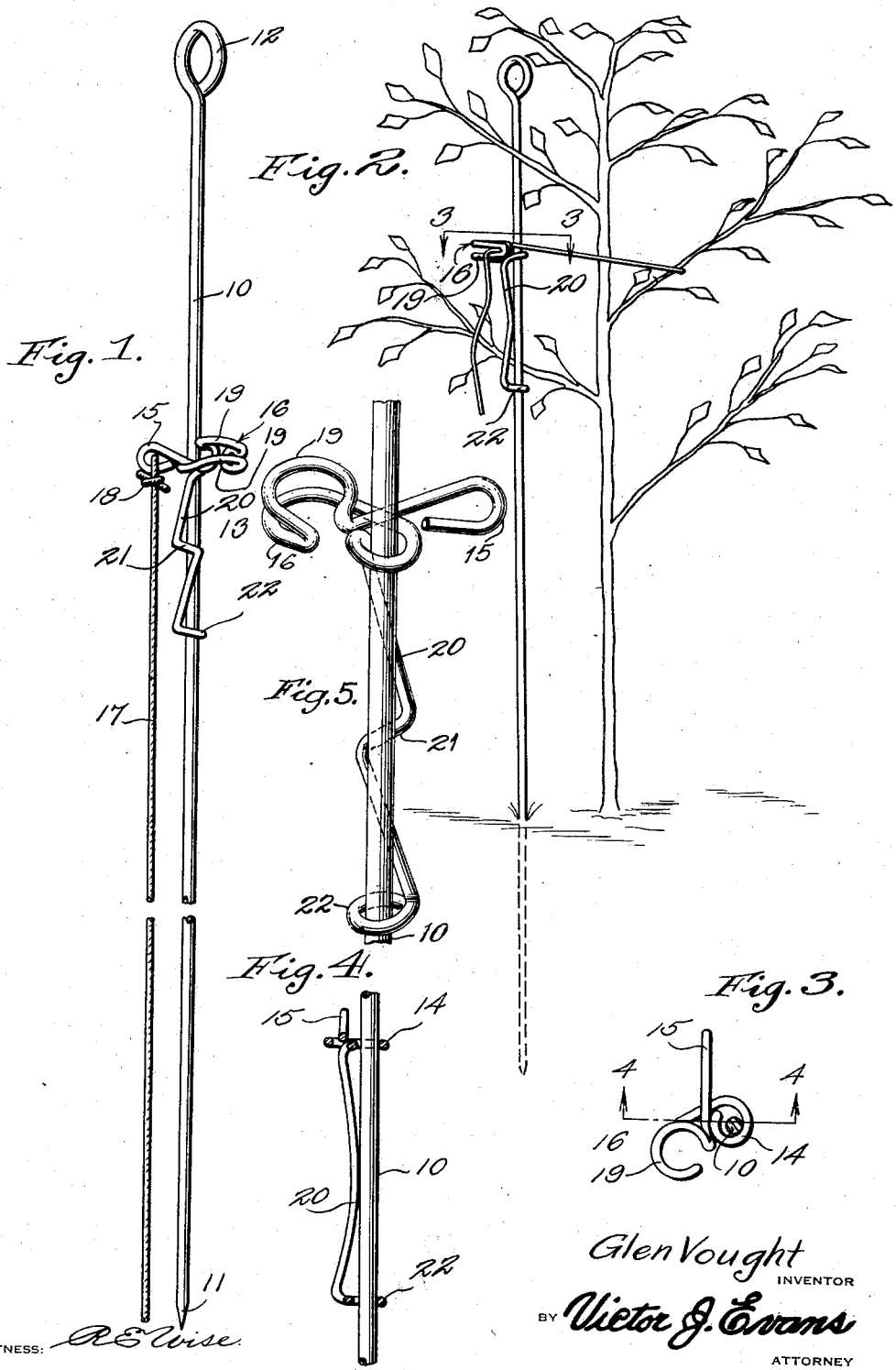

1,754,534

UNITED STATES PATENT OFFICE

GLEN VOUGHT, OF UNADILLA, NEW YORK

PLANT SUPPORT

Application filed March 16, 1928. Serial No. 262,191.

This invention relates to improvements in plant supports of the type adapted to be inserted into the ground, and having a cord carrier provided with means for attaching a cord in looped formation around a plant.

An object of the present invention is to provide an adjustable cord carrier of novel construction which is removably and frictionally engaged with a supporting stake, so that the carrier may be conveniently adjusted to the height of the plant.

With the above and other objects in view, the invention further includes the following novel features and details of construction, to be hereinafter more fully described, illustrated in the accompanying drawing and pointed out in the appended claims.

In the drawing:—

Figure 1 is an elevation of the invention.

Figure 2 is a view showing the invention in use.

Figure 3 is an enlarged sectional view on the line 3—3 of Figure 2.

Figure 4 is a fragmentary sectional view.

Figure 5 is a perspective view of the cord carrier, showing a fragmentary portion of the stake.

Referring to the drawing in detail wherein like characters of reference denote corresponding parts, the reference character 10 indicates a stake which may consist of a rod formed of metal, wood, bamboo, or other suitable material, preferably having a pointed end 11 to be inserted in the ground and an eye 12 at its opposite end. This stake may be of any suitable diameter and length and has mounted thereon a cord carrier 13.

The carrier 13 is preferably constructed from a single length of resilient wire and comprises a stake receiving loop 14, a cord attaching eye 15 and a cord engaging loop 16, the latter extending in a direction opposite the eye 15, while the loop 14 is disposed substantially central between this eye and the loop 16.

A cord 17 has one of its ends secured to the eye 15 as shown at 18 and this cord is adapted to be extended around the plant and have its opposite end removably engaged with the cord engaging loop 16. This last mentioned loop includes spaced relatively inclined arms 19, and the free end of the cord after being passed around the plant is inserted between these arms 19 and is wedged or frictionally held in place.

One of the novel features of the invention resides in the provision of means for adjusting the cord carrier longitudinally upon the stake and for this purpose, the eye 14 has extending therefrom an arm 20. This arm includes an offset portion 21 which extends across and engages the stake 10, the arm being bowed inwardly toward the stake as shown in Figure 4 of the drawing. A substantially Z-shaped arm is thus provided. A stake receiving loop 22 is carried at the lower end of the arm 20 and as the arm is formed of resilient material and is bowed inwardly, engagement of the offset portion 21 of this arm upon one side of the stake 10 will cause the loops 14 and 22 to frictionally engage the opposite side of the stake, so that the cord carrier will be frictionally and yieldingly held in place. Adjustment of the carrier may thus be quickly effected and when once adjusted, the carrier will remain in position until manually moved.

The invention is susceptible of various changes in its form, proportions and minor details of construction and the right is herein reserved to make such changes as properly fall within the scope of the appended claims.

Having described the invention what is claimed is:—

1. A plant support comprising in combination a stake adapted to be inserted in the ground, a cord carrier having a loop slidable upon the stake, a cord secured to said carrier for engagement around a plant, a spring arm extending downwardly from the cord carrier, a loop at the lower end of the arm and also slidable upon the stake and means included in the spring arm extending across and frictionally engaging one side of the stake to cause the loops to frictionally engage the other side of the stake and yieldingly hold the carrier against movement.

2. A plant support comprising in combination a stake adapted to be inserted in the ground, a cord carrier having a loop slidable upon the stake, a cord secured to the cord carrier for engagement around a plant, a substantially Z-shaped resilient arm extending downwardly from the cord carrier and engaging the stake at an intermediate point only, and a stake receiving loop at the lower end of the arm.

3. As a new article of manufacture, a cord carrier for plant supports comprising spaced stake receiving loops, a substantially Z-shaped bowed resilient arm connecting the loops, means adjacent one of the loops to secure one end of the cord, and oppositely extending means also adjacent said loop for detachable engagement with the cord, whereby the latter may be conveniently looped about a plant.

In testimony whereof I affix my signature.

GLEN VOUGHT.